(12) United States Patent
Du et al.

(10) Patent No.: US 10,564,745 B2
(45) Date of Patent: Feb. 18, 2020

(54) ARRAY SUBSTRATE AND DISPLAY PANEL

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Lingxiao Du, Shanghai (CN); Kang Yang, Shanghai (CN); Hong Ding, Shanghai (CN); Gujun Li, Shanghai (CN); Shaofan Liu, Shanghai (CN)

(*) Notice: Subject to any disclaimer, the term of this patent is extended or adjusted under 35 U.S.C. 154(b) by 36 days.

(21) Appl. No.: 15/173,960

(22) Filed: Jun. 6, 2016

(65) Prior Publication Data

US 2017/0228074 A1    Aug. 10, 2017

(30) Foreign Application Priority Data

Feb. 5, 2016 (CN) .......................... 2016 1 0097205

(51) Int. Cl.
*G06F 3/041* (2006.01)
*G06F 3/044* (2006.01)
*G02F 1/1335* (2006.01)
*G02F 1/1362* (2006.01)
*G02F 1/1368* (2006.01)
*G02F 1/1333* (2006.01)

(52) U.S. Cl.
CPC ...... *G06F 3/0412* (2013.01); *G02F 1/133514* (2013.01); *G02F 1/136286* (2013.01); *G06F 3/044* (2013.01); *G06F 3/0416* (2013.01); G02F 1/13338 (2013.01); G02F 2001/13685 (2013.01); G02F 2001/136222 (2013.01); G06F 2203/04111 (2013.01)

(58) Field of Classification Search
CPC ... G06F 3/0412; G06F 3/044; G02F 1/133514
See application file for complete search history.

(56) References Cited

U.S. PATENT DOCUMENTS 9,024,913 B1 * 5/2015 Jung ..................... G06F 3/044
                                                            345/174
9,851,825 B2 * 12/2017 Kim .................... G06F 3/0412
9,910,530 B2 * 3/2018 Aoyama .............. G06F 3/0416
(Continued)

FOREIGN PATENT DOCUMENTS

CN            103474436 A        12/2013

OTHER PUBLICATIONS

Examination Report of Indian Patent Application No. 201634019003 dated Dec. 28, 2018.

*Primary Examiner* — Nitin Patel
*Assistant Examiner* — Robert M Stone
(74) *Attorney, Agent, or Firm* — Kilpratick Townsend & Stockton, LLP

(57) ABSTRACT

The present disclosure provides an array substrate including a display region and a frame region surrounding the display region. The display region further includes a plurality of second touch lines which are in parallel with the gate electrode lines, and each of the common electrode units is electrically connected to one of the second touch lines through a via hole. The frame region consists of a plurality of first switches and a plurality of test lines extending along a second direction, at least one end of each second touch line is connected to one of the first switches, and the test lines are electrically connected to the first switches.

20 Claims, 10 Drawing Sheets

(56) References Cited

U.S. PATENT DOCUMENTS

| | | | |
|---|---|---|---|
| 2008/0055224 A1 | 3/2008 | Hur et al. | |
| 2008/0170195 A1* | 7/2008 | Kwon | G02F 1/1309 349/143 |
| 2009/0002336 A1* | 1/2009 | Choi | G06F 3/0412 345/174 |
| 2009/0273753 A1* | 11/2009 | Park | G09G 3/006 349/152 |
| 2010/0194697 A1* | 8/2010 | Hotelling | G06F 3/0412 345/173 |
| 2012/0086654 A1* | 4/2012 | Song | G06F 3/0412 345/173 |
| 2012/0218199 A1* | 8/2012 | Kim | G06F 3/0412 345/173 |
| 2013/0050130 A1 | 2/2013 | Brown | |
| 2013/0147724 A1* | 6/2013 | Hwang | G06F 3/0412 345/173 |
| 2013/0162570 A1* | 6/2013 | Shin | G06F 3/041 345/173 |
| 2013/0321010 A1* | 12/2013 | Cooley | G06F 3/0418 324/750.01 |
| 2014/0132526 A1* | 5/2014 | Lee | G06F 3/0412 345/173 |
| 2014/0160062 A1* | 6/2014 | Kim | G02F 1/13338 345/174 |
| 2014/0240279 A1* | 8/2014 | Hwang | G06F 3/0412 345/174 |
| 2014/0306916 A1* | 10/2014 | Wang | G06F 3/041 345/173 |
| 2015/0214245 A1 | 7/2015 | Kim et al. | |
| 2015/0286317 A1* | 10/2015 | Shepelev | G06F 3/0416 345/174 |
| 2015/0324033 A1* | 11/2015 | Kim | G06F 3/044 345/174 |
| 2015/0346885 A1* | 12/2015 | Ding | G06F 3/0412 345/173 |
| 2016/0041666 A1* | 2/2016 | Lee | G02F 1/13338 345/174 |
| 2016/0062504 A1* | 3/2016 | Hwang | G06F 3/0412 345/174 |
| 2016/0188040 A1* | 6/2016 | Shin | G06F 3/047 345/174 |
| 2016/0209942 A1* | 7/2016 | Yang | G06F 3/0412 |
| 2016/0253023 A1* | 9/2016 | Aoyama | G06F 3/0416 345/174 |
| 2016/0293077 A1* | 10/2016 | Ma | G09G 3/006 |
| 2016/0327835 A1* | 11/2016 | Xie | G06F 3/0412 |
| 2016/0328070 A1* | 11/2016 | Lin | G06F 3/0416 |
| 2016/0358525 A1* | 12/2016 | Huang | G09G 3/3655 |
| 2016/0364068 A1* | 12/2016 | Cheng | G06F 3/0416 |
| 2017/0205956 A1* | 7/2017 | Li | G02F 1/13338 |

* cited by examiner

ARRAY SUBSTRATE AND DISPLAY PANEL

CROSS REFERENCE OF RELATED APPLICATION

This application claims the priority to Chinese Patent Application No. 201610097205.5, entitled "Array substrate and display panel", filed with the Chinese State Intellectual Property Office on Feb. 5, 2016, which is incorporated by reference in its entirety herein.

FIELD

The present disclosure relates to the field of display technology, and more particularly, to an array substrate and a display panel which can improve the display effect of the panel.

BACKGROUND

With the development of human-computer interaction technology, touch technology is increasingly used in a variety of displays. Capacitive touch technology is widely used due to its advantages of wear resistance, long service life, low maintenance cost for user, and capability of supporting gesture recognition and multi-touch.

Capacitive touch technology can be classified into self-capacitance touch technology and mutual capacitance touch technology depending on the detection method of capacitance between objects. Through the self-capacitance touch technology, presence, location and movement of an input object on a touch screen is detected according to change in capacitance between the input object and an electrode. Through the mutual capacitance touch technology, presence, location and movement of an input object on a touch screen is detected according to change in capacitance between electrodes caused by the input object.

In the prior art, no matter it is the self-capacitance touch technology or the mutual capacitance touch technology, a common electrode in an array substrate can be reused as a touch electrode. In a display stage, a common electrode signal is input to the common electrode; and in a touch stage, a touch signal is input to the common electrode. Both of the signal transmission and polarity detection of the common electrode are realized through touch lines.

Specifically, referring to an array substrate 100 in the prior art as shown in FIG. 1, the array substrate 100 has a side length along a direction Y larger than a side length along a direction X. The array substrate 100 includes a plurality of common electrodes 110, which are reused as touch electrodes. Each of the common electrodes 110 is electrically connected through a via hole 130 to a touch line 120 extending along the direction Y, and is electrically connected to a touch control IC140 through the touch line 120. The touch control IC140 transmits common electrode signals or touch signals to the common electrodes 110 through the touch lines 120 for display or touch detection.

In order to improve the display and touch yield of the array substrate 100, the touch performance and display performance of the common electrodes 110 are detected. As shown in FIG. 2, in order to perform the detection of the touch performance and display performance of the common electrodes 110, test lines and switch elements 150 are further provided. Each touch line 120 is electrically connected to a first electrode of one switch element 150. Control terminals of the switch elements 150 are electrically connected to a test line 160C. Second electrodes of the switch elements 150 are electrically connected to a test line 160A or a test line 160B. During test, the test line 160C inputs a control signal to the switch elements 150 to turn on the switch elements 150, and the test line 160A or the test line 160B inputs a different voltage. During display and touch, the switch elements 150 are turned off, and the common electrodes 110 are electrically connected to the touch control IC140 through the touch lines 120 as shown in FIG. 1.

However, in the prior art, such configuration of the array substrate 100 can cause the following problems:

1) A touch line electrically connected to a top common electrode has a resistance much larger than that of a touch line electrically connected to a bottom common electrode, resulting in poor visibility at the top end when displaying a harsh image (e.g., performing dot check/pixel check).

2) The above difference in resistance cannot be eliminated by shorting the common electrodes through the switch elements and the test lines.

3) For a display panel of a large size (8 inches and above), the larger the difference in resistance, the more significantly the display effect will be negatively affected.

SUMMARY

According to one aspect of the present disclosure, there is provided an array substrate including a display region and a frame region surrounding the display region. The display region consists of a common electrode layer, a touch line layer and a gate electrode layer. The common electrode layer includes a plurality of common electrode units. The touch line layer includes a plurality of first touch lines electrically connected to the common electrode units; the gate electrode layer includes a plurality of gate electrode lines extending along a first direction. The display region further includes a plurality of second touch lines which are in parallel with the gate electrode lines. Each of the common electrode units is electrically connected to one of the second touch lines through a via hole. The frame region consists of a plurality of first switches and a plurality of test lines extending along a second direction. At least one end of each second touch line is connected to one of the first switches. The test lines are electrically connected to the first switches.

In another aspect of the present disclosure, there is provided a display panel including an array substrate and a color film substrate disposed oppositely to each other, and a liquid crystal layer between the array substrate and the color film substrate, wherein the array substrate is the array substrate as described above.

The array substrate and the display panel of the present disclosure have the following advantages over the prior art:

1) Test and display are performed by additionally providing second touch lines extending along the first direction (the shorter side of the array substrate), and compared with the scheme of providing only first touch lines extending along the second direction (the longer side of the array substrate), the resistance differences can be decreased, and the display effect of the display panel can be improved.

2) The common electrode units are tested for display and touch by detecting based on column inversion and pointe inversion, which can improve the accuracy of the test.

3) By providing first switches and test lines, the common electrodes are short circuited when the display panel is displaying, such that resistance of the touch lines in each row of common electrode units is the same, therefore, the display effect of the display panel can be further improved.

BRIEF DESCRIPTION OF THE DRAWINGS

Other features, objectives and advantages of the present disclosure will become apparent from the detailed description of non-limiting embodiments with reference to the following accompanying drawings.

DETAILED DESCRIPTION

Exemplary embodiments will now be more fully described with reference to the accompanying drawings. However, the exemplary embodiments can be implemented in various forms, and should not be understood as limited to the embodiments set forth herein. On the contrary, these embodiments are provided to make the present disclosure thorough and complete, and to fully convey the concept of the exemplary embodiments to those skilled in the art. Similar numeral reference denotes similar or same structures throughout the accompanying drawings, and repeat description thereof will be omitted.

In order to solve the defect of a poor display effect of a display panel in the prior art, the present disclosure provides an array substrate. The array substrate includes a display region and a frame region surrounding the display region. The display region consists of a common electrode layer, a touch line layer and a gate electrode layer. The common electrode layer includes a plurality of common electrode units. The touch line layer includes a plurality of first touch lines electrically connected to the common electrode units. The gate electrode layer includes a plurality of gate electrode lines extending along a first direction. The display region also includes a plurality of second touch lines which are in parallel with the gate electrode lines. Each of the common electrode units is electrically connected to one of the second touch lines through a via hole. The frame region consists of a plurality of first switches and a plurality of test lines extending along a second direction. At least one end of each second touch line is connected to one of the first switches. The test lines are electrically connected to the first switches.

Figure 1:
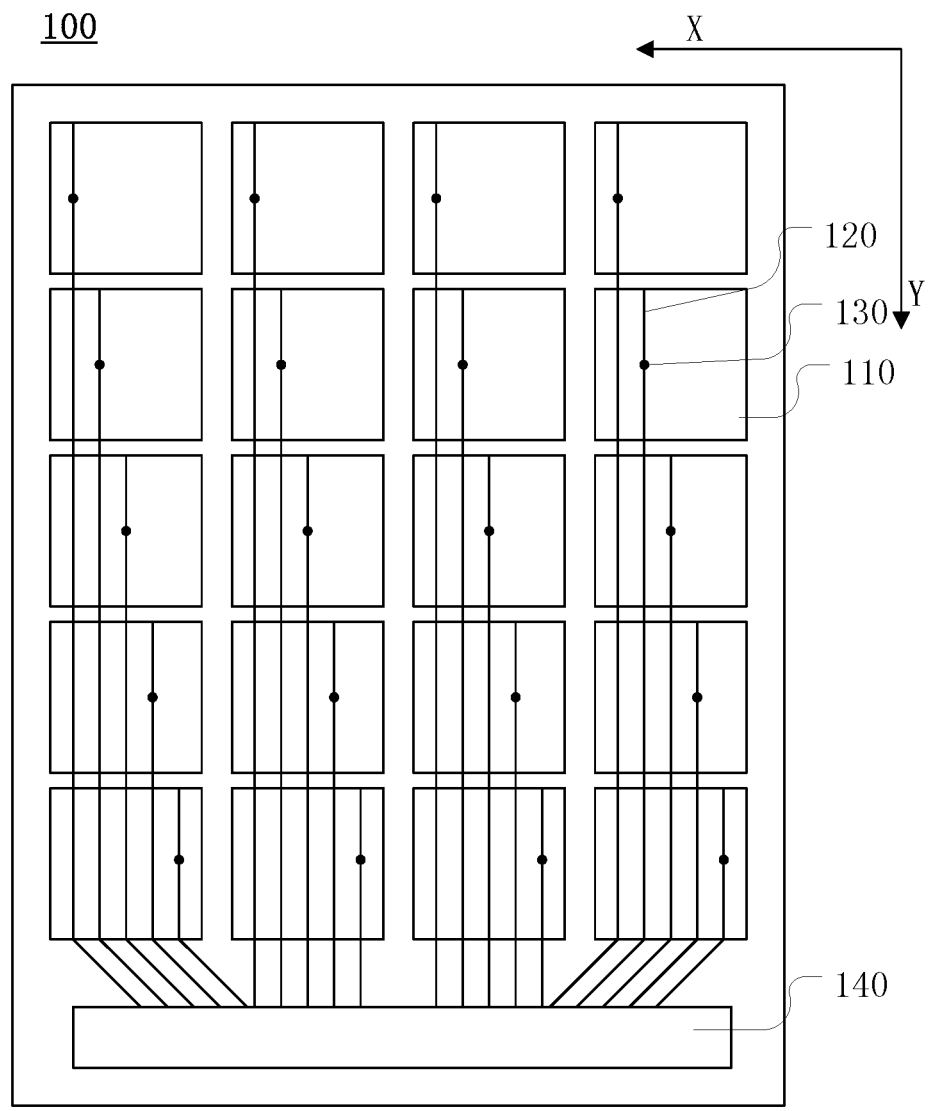
FIG. 1 is a schematic diagram of an array substrate in the prior art.
Figure 2:
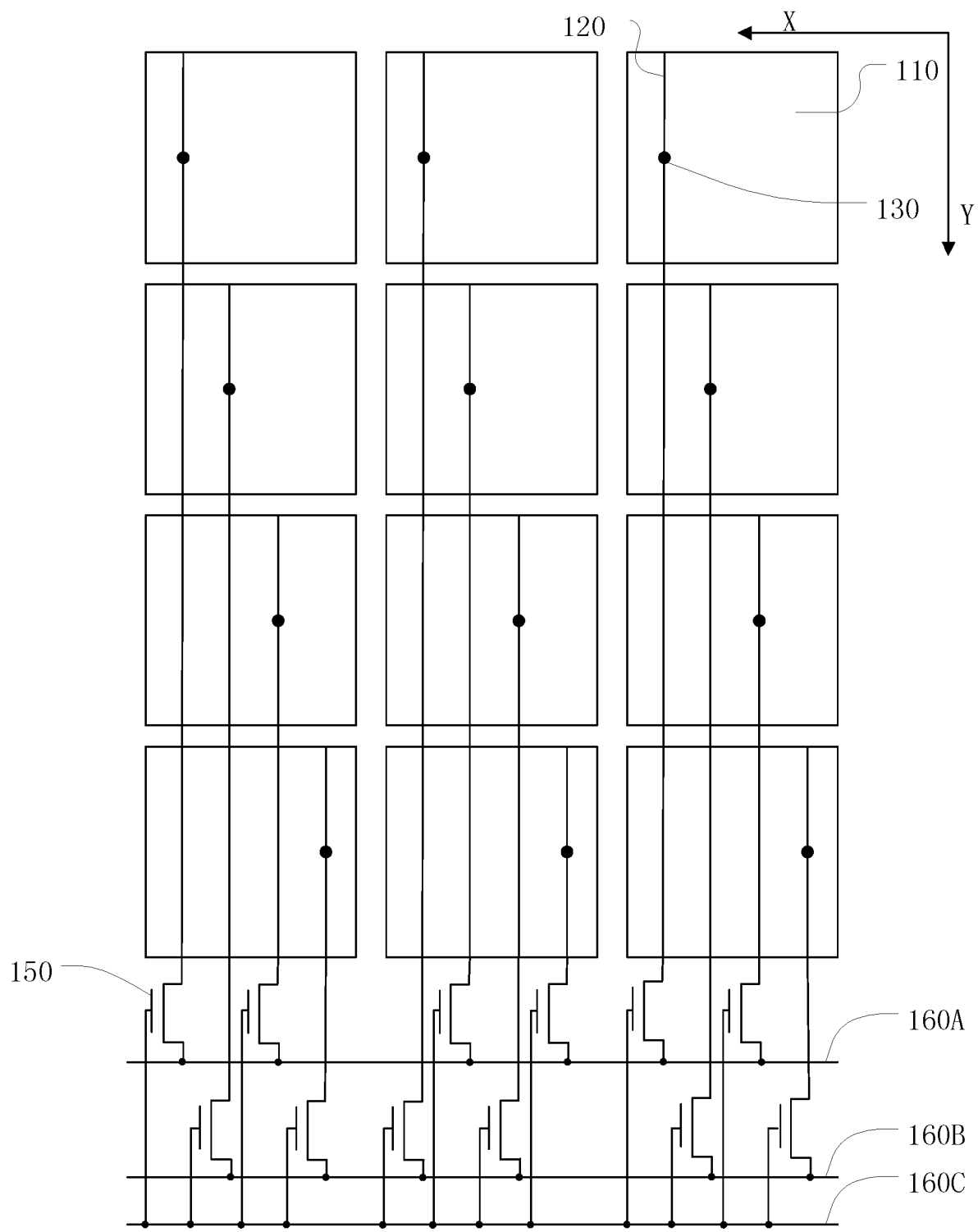
FIG. 2 is a schematic diagram of an array substrate having test lines and switch elements in the prior art.
Figure 3:
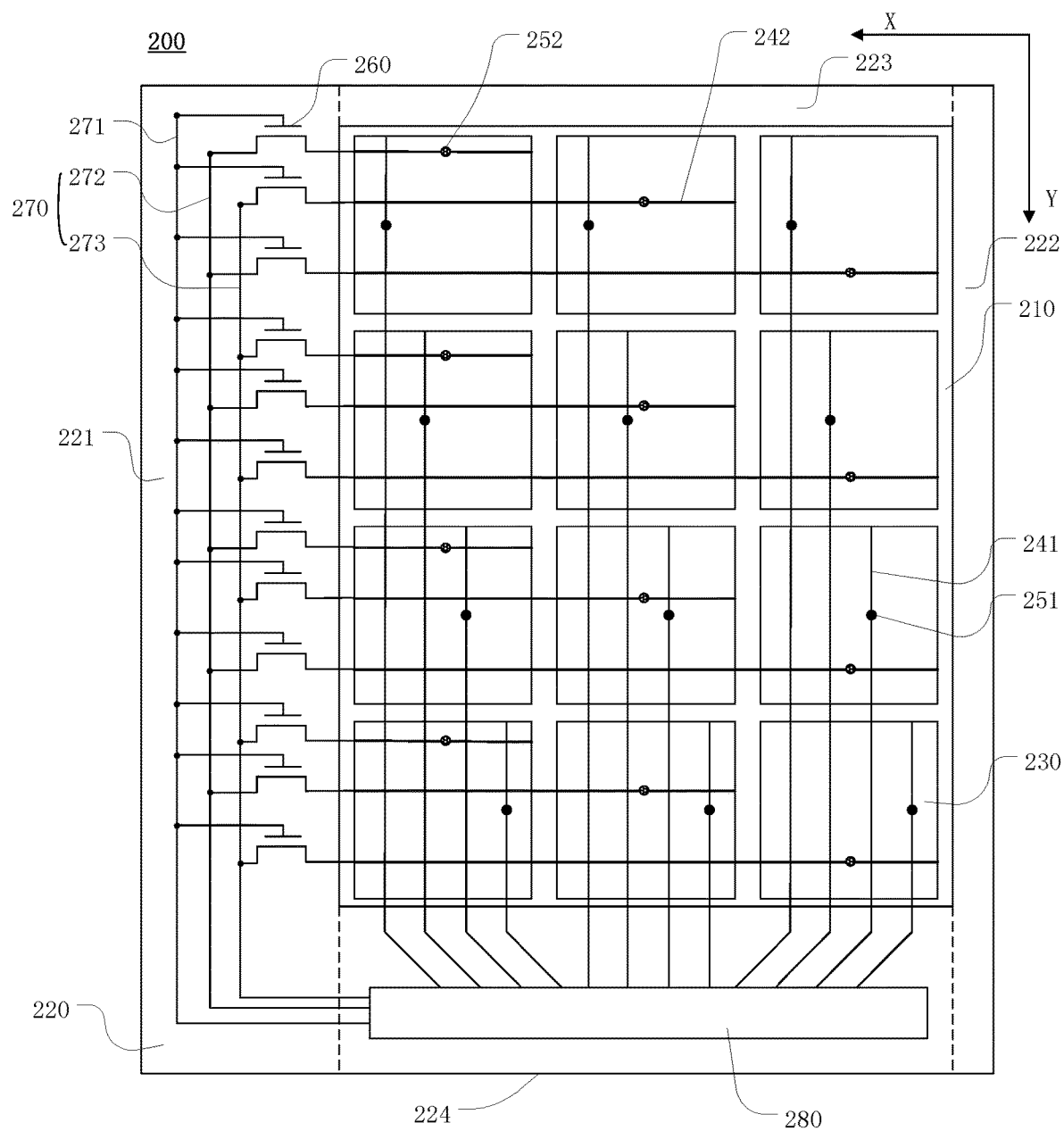
FIG. 3 is a schematic diagram of an array substrate according to an embodiment of the present disclosure.

The present disclosure provides an array substrate. First, referring to FIG. 3, FIG. 3 is a schematic diagram of an array substrate 200 according to an embodiment of the present disclosure. The array substrate 200 includes a display region 210 and a frame region 220 surrounding the display region 210. The display region 210 consists of a common electrode layer, a touch line layer and a gate electrode layer.

The common electrode layer includes a plurality of common electrode units 230. In the present embodiment, the common electrode units 230 are arranged along a direction X (a first direction) and a direction Y (a second direction), to form a matrix of the common electrode units 230. The direction X is perpendicular to the direction Y. In some embodiments, as in this embodiment, the direction X is a direction along which a shorter side of the array substrate 200 extends, and the direction Y is a direction along which a longer side of the array substrate 200 extends. For clarity, the common electrode units 230 are shown as having rectangular shapes. However, it would be understood by those skilled in the art that, the common electrode units 230 can also have other regular or irregular shapes, depending on specific processes or display requirements.

In some embodiments, the common electrode units 230 can be reused as self-capacitive touch electrodes. In other words, in this case, the common electrode units 230 are used as common electrodes in a display stage, and used as self-capacitive touch electrodes in a touch stage. When the common electrode units 230 are reused as self-capacitive touch electrodes, detection of touch is performed by sensing changes in capacitance between the common electrode units 230 and an input object such as a touch pen.

In still another embodiment, the common electrode units 230 are reused as driving touch electrodes or sensing touch electrodes in the mutual capacitive touch technology. In other words, in this case, the common electrode units 230 are used as common electrodes in a display stage, and used as driving touch electrodes or sensing touch electrodes in a touch stage. When the common electrode units 230 are used as driving touch electrodes, in order to detect touch, the common electrode units 230 are co-operated with sensing touch electrodes, which can be disposed on the same substrate as the common electrodes or on a separate substrate. When the common electrode units 230 are used as sensing touch electrodes, for detecting touch, the common electrode units 230 are co-operated with driving touch electrodes which can be disposed on a same substrate as the common electrodes or on a separate substrate.

No matter the common electrode units 230 are reused as self-capacitive touch electrodes or driving touch electrodes (or sensing touch electrodes), the transmission of touch signals are performed through touch lines.

In order to perform the transmission of touch signals, the touch line layer includes a plurality of first touch lines 241 electrically connected to the common electrode units 230. In this embodiment, the plurality of first touch lines 241 are extended along the direction Y and are arranged along the direction X. Each of the first touch lines 241 is electrically connected to one common electrode unit 230 through a via hole 251, to transmit touch signals.

In some embodiments, the gate electrode layer of the array substrate 200 is also provided with second touch lines 242. In other words, in the present embodiment, the gate electrode layer includes a plurality of gate electrode lines extending along the direction X and the second touch lines 242. Each of the common electrode units 230 is electrically connected to one second touch line 242 through a via hole 252. In addition, the frame region 220 consists of a plurality of first switches 260 and a plurality of test lines 270 extending along the direction Y. At least one end of each second touch line 242 is electrically connected to a first switch 260. The test lines 270 are electrically connected to the first switches 260. In other embodiments, the second touch lines 242 can also be disposed at a separate layer from the layer of the gate electrode lines. This will not be exemplified, and solutions devised by those skilled in the art based on the embodiments herein all belong to the protective scope of the present disclosure.

Specifically, the first switches 260 can be thin film transistors. One end of each second touch line 242 is electrically connected to a first electrode (such as a source electrode or a drain electrode) of a thin film transistor 260. The test lines 270 are electrically connected to second electrodes (such as source electrodes or drain electrodes) of the thin film transistors 260. In the present embodiments, the array substrate also includes at least one test control line 271 electrically connected to control terminals (gate electrodes) of the thin film transistors 260.

In the present embodiment, the test lines 270 include a first test line 272 and a second test line 273. Each of the first test line 272 and the second test line 273 is electrically connected to a different group of common electrode units 230 via a different group of first switches 260.

Specifically, in the embodiment as shown in FIG. 3, each second touch line 242 has one end electrically connected to one thin film transistor 260. In other words, each common electrode unit 230 is electrically connected to one thin film transistor 260 through one second touch line 242. Each thin film transistor 260 has a gate electrode electrically connected to one test control line 271. Each thin film transistor 260 has a source electrode (or drain electrode) electrically connected to the first test line 272 or the second test line 273.

In the present disclosure, display function, touch function and display, touch test function can be implemented through the above configuration of lines. Specifically, during display test, the test control line 271 controls the thin film transistors 260 into turned-on states, and the first test line 272 and the second test line 273 respectively input a common voltage through the second touch lines 242. During touch test, in a first stage of each cycle, the first test line 272 transmits a high level signal to the common electrode units 230, which are electrically connected to the first test line 272 through the second touch lines 242. The second test line 273 transmits a low level signal to the common electrode units 230, which are electrically connected to the second test line 273 through the second touch lines 242. In a second stage of each cycle, the first test line 272 transmits a low level signal to the common electrode units 230 which are electrically connected to the first test line 272 through the second touch lines 242, and the second test line 273 transmits a high level signal to the common electrode units 230, which are electrically connected to the second test line 273 through the second touch lines 242. In this way, the touch and display test function of the common electrode units 230 can be realized.

During display, the test control line 271 controls the thin film transistors 260 into turned-on states, and the first test line 272 and the second test line 273 input common electrode signals. Specifically, during display stage, the first test line 272 and the second test line 273 transmit display signals (common electrode signals) to the common electrode units 230 through the second touch lines 242, to implement display function.

During touch, the test control line 271 controls the thin film transistors 260 into turned-off states. Specifically, in the touch stage, since the thin film transistors 260 are in turned-off states, the touch signals are transmitted through the first touch lines 241.

It can be seen that, in the present disclosure, the display function and the display and touch test function are implemented through the second touch lines 242, and the touch function is implemented through the first touch lines 241. Moreover, since the shorter side of the array substrate, which is extended along the direction X, is shorter than the longer side thereof, which extends along the direction Y, correspondingly, the shorter side of the display region 210, which is extended along the direction X, is shorter than the longer side thereof, which is extended along the direction Y. In the display region 210, the longest second touch line 242 extending along the direction X is shorter than the longest first touch line 241 extending along the direction Y. Thus, the maximum length difference between any two of the second touch lines 242 is less than the maximum length difference between any two of the first touch lines 241. In other words, the maximum resistance difference between any two of the second touch lines 242 is less than the maximum resistance difference between any two of the first touch lines 241. Then, display through the second touch lines 242 can improve the poor display effect, and display and touch test through the second touch lines 242 can improve the test accuracy.

In addition, in a specific example of the present embodiment, the array substrate 200 also includes a touch control IC 280 in the frame region 220. The first touch lines 241 are electrically connected to the touch control IC 280. The second touch lines 241 are electrically connected to the touch control IC 280 through the thin film transistors 260 and the test lines 270. The touch control IC 280 is configured to transmit touch signals to the common electrode units 230 through the first control touch lines 241, and transmit display signals (common electrode signals) to the common electrode units 230 through the second control touch lines 242, and transmit touch signals and display signals (common electrode signals) to separate common electrode units 230 through the second control touch lines 242.

In the embodiment as shown in FIG. 3, the frame region 220 includes a first frame sub-region 221 and a second frame sub-region 222 respectively distributed at the two sides of the display region 210 along the direction X. Since in the embodiment of FIG. 3, each second touch line 242 only has one end electrically connected to a thin film transistor 260. The thin film transistors 260 are positioned in the first frame sub-region 221 and part of the test lines 270 is positioned in the second frame sub-region 222. In some modified examples of the present embodiment, the thin film transistors 260 can be positioned in the second frame sub-region 222 and part of the test lines 270 can also be positioned in the second frame sub-region 222. In some modified examples, each second touch line 242 has both ends electrically connected to a thin film transistors 260, then, the thin film transistors 260 are positioned in the first frame sub-region 221 and the second frame sub-region 222, and part of the test lines 270 is positioned in the first frame sub-region 221 and the second frame sub-region 222.

In the embodiment as shown in FIG. 3, the frame region also includes a third frame sub-region 223 and a fourth frame sub-region 224 respectively distributed at the other two sides of the display region 220 along the direction Y. The touch control IC 280 can be positioned in the third frame sub-region 223 or the fourth frame sub-region 224.

Hereinafter, two implementations of the laminated structure of the array substrate of the present disclosure will be described with reference to FIGS. 4-6.

Figure 4:
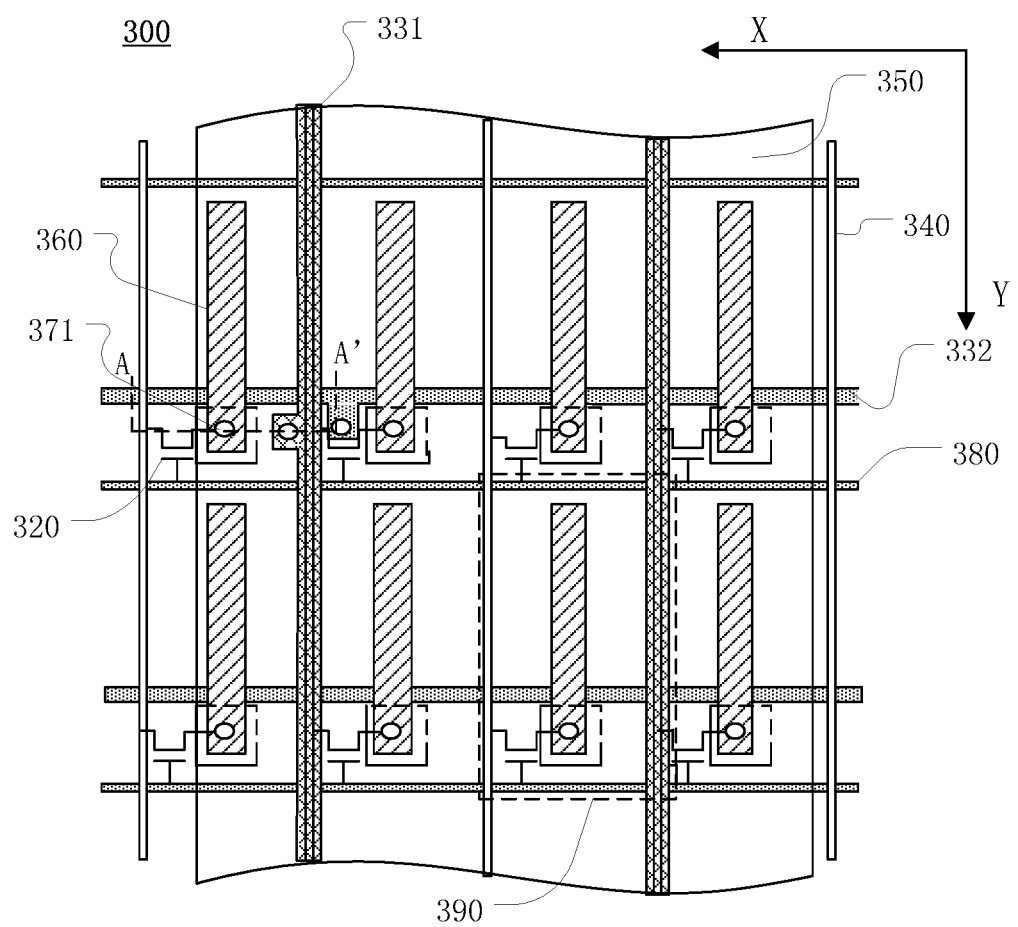
FIG. 4 is a schematic partial diagram of an array substrate according to an embodiment of the present disclosure.

As shown in FIG. 4, an array substrate 300 has a display region including a plurality of pixel regions 390. In each pixel region 390, a thin film transistor 320 for driving a pixel to display and a pixel electrode 360 are provided. Common electrode units 350 cover the plurality of pixel regions 390.

First touch lines 331 and data lines 340 extend along the direction Y. Second touch lines 332 and gate electrode lines 380 extend along the direction X. FIG. 4 only illustrates a top view of the array substrate 300, and for clarity, patters on each layer of the array substrate 300 and part of the via holes are omitted.

Figure 5:
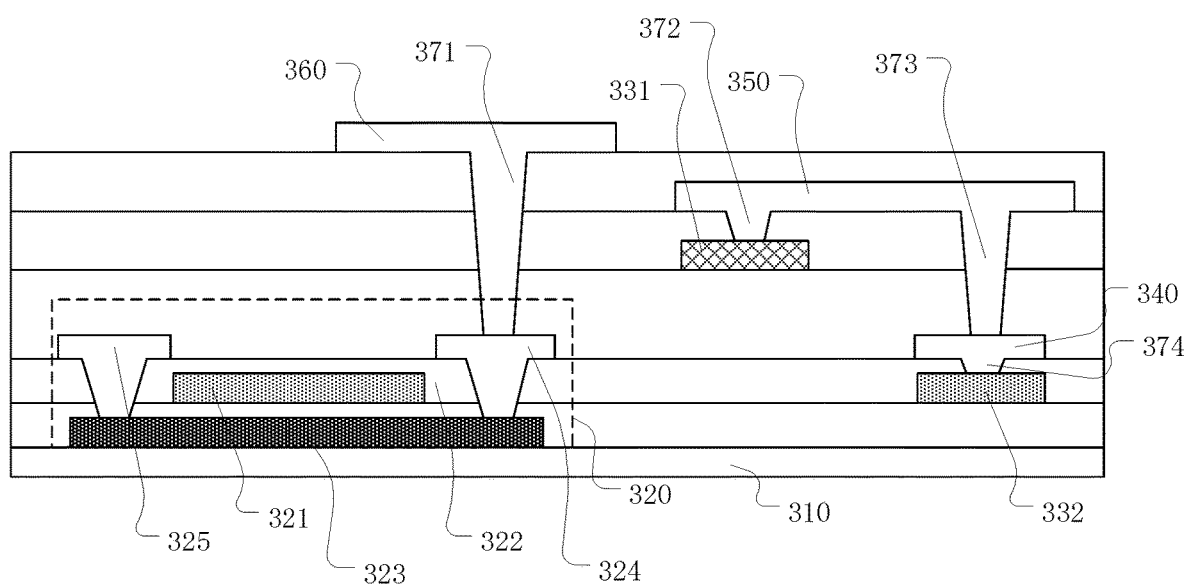
FIG. 5 is a cross sectional view of the array substrate as shown in FIG. 4 along a direction A-A' according to an embodiment.

Referring to FIG. 5, FIG. 5 is a cross sectional view of the array substrate 300 as shown in FIG. 4 along a direction A-A' according to an embodiment. The array substrate 300 includes a substrate 310. On the substrate 310, a thin film transistor 320 for driving a pixel electrode 360 is provided. The thin film transistor 320 includes a semiconductor layer 323, a gate electrode 321, a gate electrode insulating layer 322, a source electrode 324 and a drain electrode 325 successively formed on the substrate 310. In some embodiments, as in the present embodiment, the semiconductor layer 323 is made of low-temperature polysilicon material. The second touch line 332 and the gate electrode 321 are positioned at the same layer. The data line 340, the source electrode 324 and the drain electrode 325 are positioned at the same layer. The data line 340 is electrically connected to the second touch line 332 through a via hole 374. The first touch line 331 is positioned between the common electrode layer 350 and a layer where the data line 340 is positioned. The common electrode layer 350 is over the first touch line 331. The common electrode layer 350 is electrically connected to the data line 340 through a deep hole 373 and in turn electrically connected to the second touch line 332. The common electrode layer 350 is electrically connected to the first touch line 331 through a shallow hole 372. A pixel electrode layer 360 is positioned over the common electrode layer 350, and is electrically connected to the source electrode 324 through the via hole 371.

Figure 6:
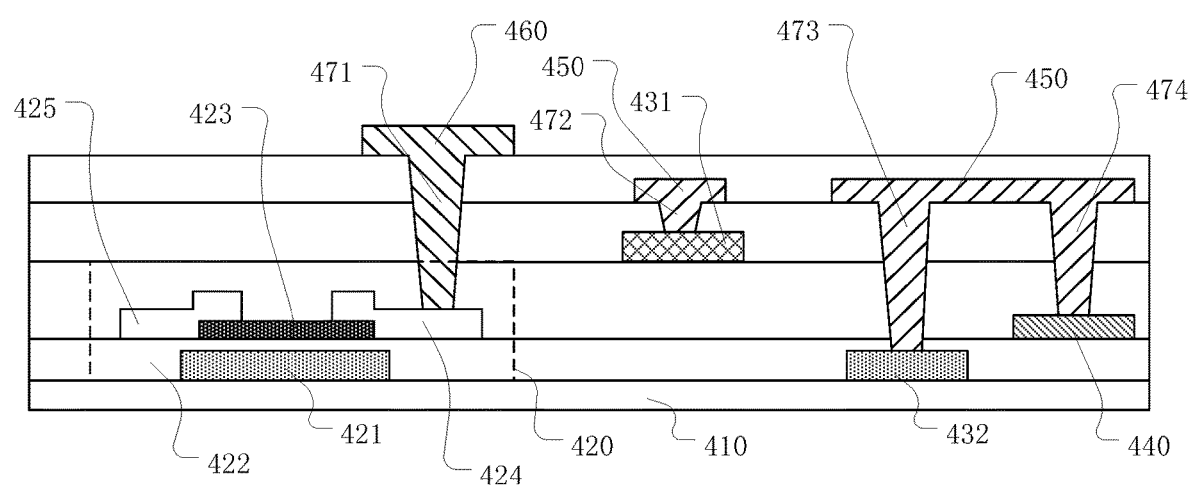
FIG. 6 is a cross sectional view of the array substrate as shown in FIG. 4 along a direction A-A' according to another embodiment.

Referring to FIG. 6, FIG. 6 is a cross sectional view of the array substrate 300 as shown in FIG. 4 along a direction A-A' according to another embodiment. In FIG. 6, the array substrate includes a substrate 410. On the substrate 410, a thin film transistor 420 for driving a pixel electrode 460 is provided. The thin film transistor 420 includes a gate electrode 421, a gate electrode insulating layer 422, a semiconductor layer 423, a source electrode 424 and a drain electrode 425 successively formed on the substrate 410. Optionally, in the present embodiment, the semiconductor layer 423 is made of amorphous silicon material. A second touch line 432 and the gate electrode 421 are positioned at the same layer. A data line 440, the source electrode 424 and the drain electrode 425 are positioned at the same layer. A first touch line 431 is positioned over a layer where the data line 440 is positioned. A common electrode layer 450 is positioned over the first touch line 431. The common electrode layer 450 is electrically connected to the first touch line 431 through a via hole 472. The common electrode layer 450 is electrically connected to the second touch line 432 through a via hole 473. The common electrode layer 450 is electrically connected to a data line 440 through a via hole 474. Although the common electrode layer 450 is shown as broken in FIG. 6, in fact, the common electrode layer 450 which is electrically connected to the first touch line 431 and the common electrode layer 450 which is electrically connected to the second touch line 432 are connected elsewhere. A pixel electrode layer 460 is positioned over the common electrode layer 450, and is electrically connected to the source electrode 424 through the via hole 471.

It should be understood by those skilled in the art that, FIGS. 5 and 6 only illustrate laminated structure of the array substrate, the positional relationship between the layers is not limited thereto. For example, the common electrode layer can be positioned over the pixel electrodes. For another example, the first touch lines can be positioned at the same layer as the pixel electrodes. Those skilled in the art can devise other modified embodiments in practice of panel design, which will not be elaborated herein.

Hereinafter embodiments involving connection among the common electrode units, the first switches and the test lines will be described with reference to FIGS. 7-9.

Figure 7:
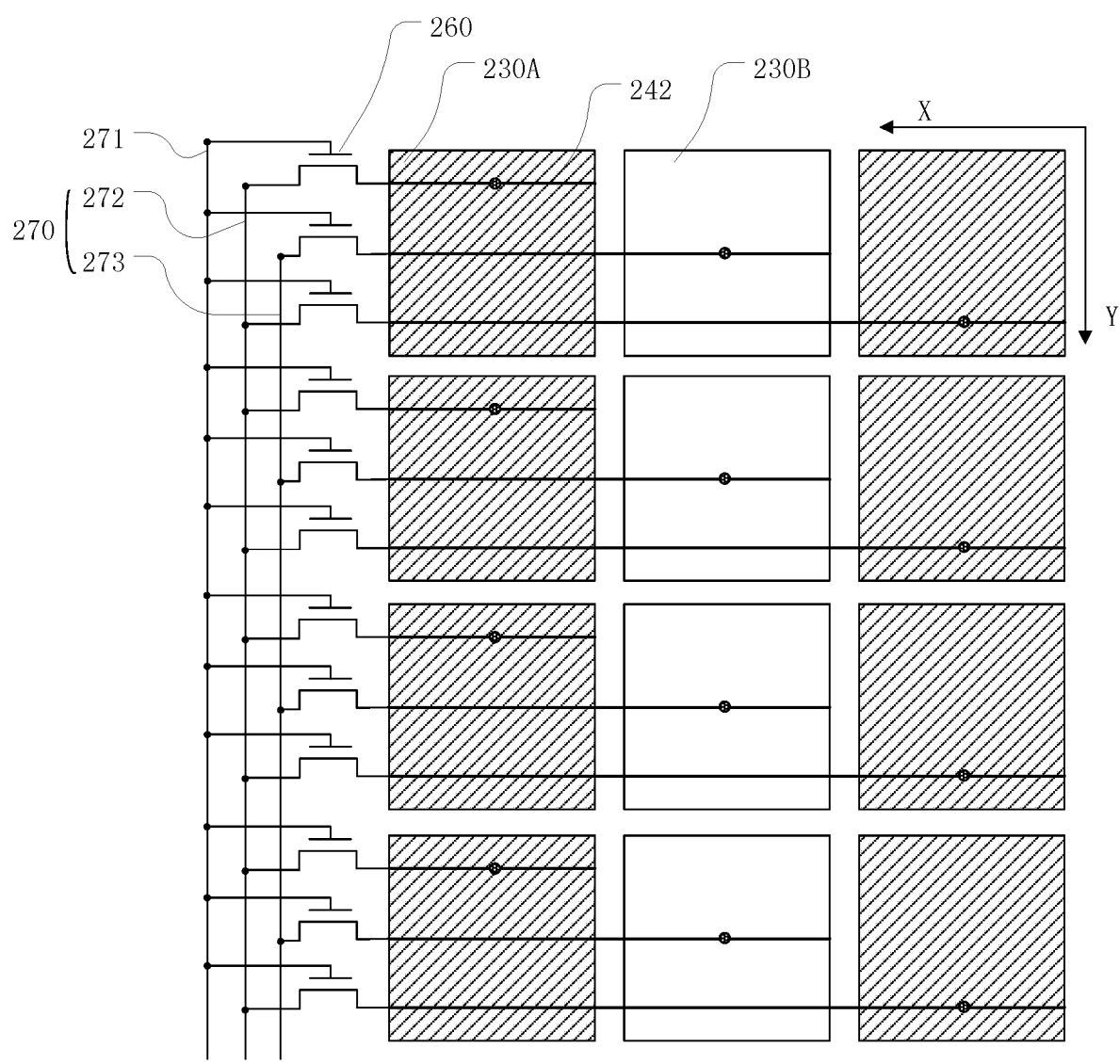
FIG. 7 is a schematic diagram of connection among common electrode units, first switches and test lines as shown in FIG. 3 according to an embodiment.

FIG. 7 is a schematic diagram of connection among common the electrode units, the first switches and the test lines as shown in FIG. 3 according to an embodiment. In the embodiment shown in FIG. 7, the common electrode units 230A (shown in hatched patterns in the figure) in odd numbers of columns are electrically connected to the first test line 272 through the thin film transistors 260, and the common electrode units 230B in even numbers of columns are electrically connected to the second test line 273 through the thin film transistors 260.

During test, the test control line 271 controls the thin film transistors 260 into turned-on states. The first test line 272 inputs a voltage to the common electrode units 230A in odd numbers of columns through the second touch lines 242. The second test line 273 inputs a voltage different from that of the first test line 272 to the common electrode units 230B in even numbers of columns through the second touch lines 242. The voltages input by the first test line 272 and the second test line 273 are changed periodically, to perform display and touch test based on column inversion.

In the present embodiment, since each second touch line 242 has only one end electrically connected to a thin film transistor 260, the maximum resistance difference of the second touch lines 242 is relatively small, and the thin film transistors 260 at the frame region and the line region of the test lines 270 are relatively small.

Figure 8:
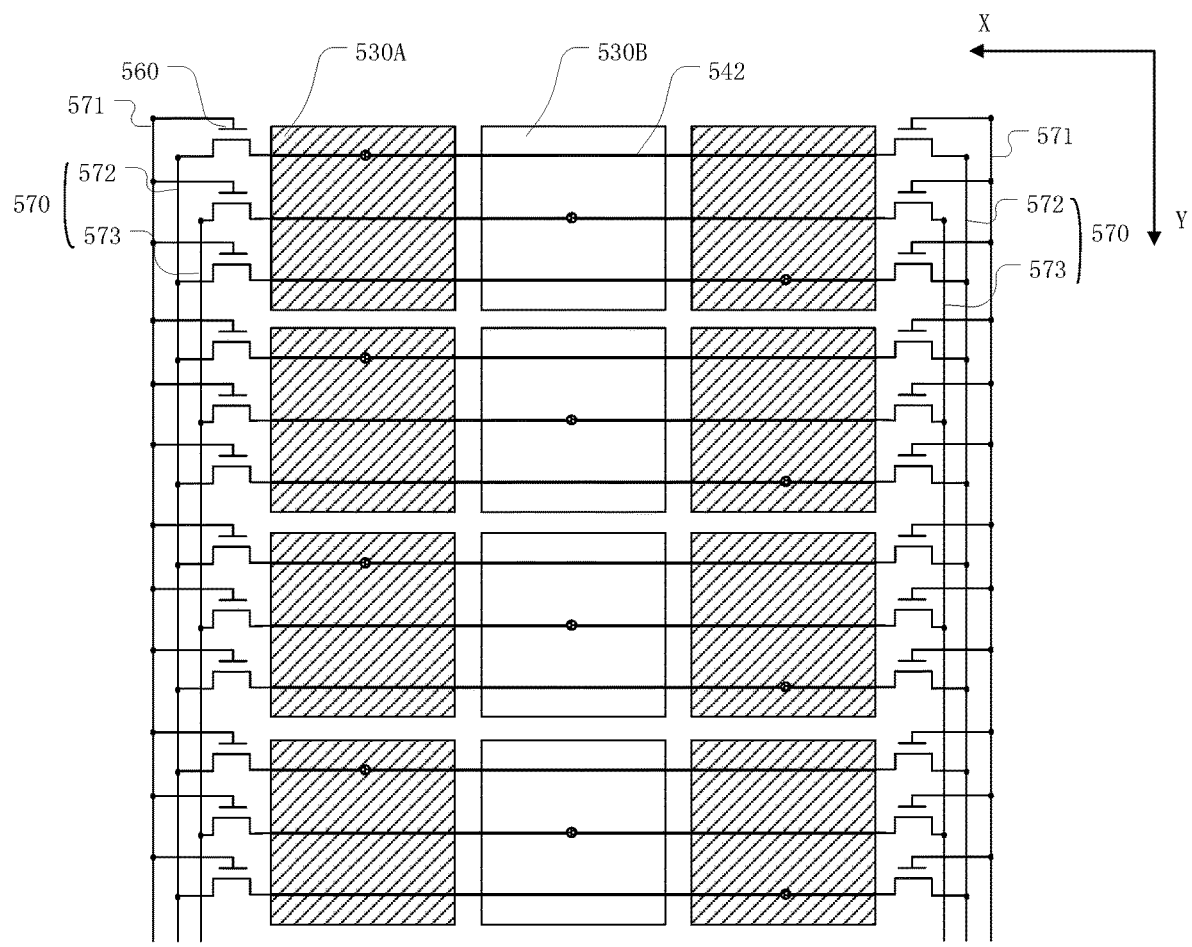
FIG. 8 is a schematic diagram of connection among common electrode units, first switches and test lines as shown in FIG. 3 according to another embodiment.

FIG. 8 is a schematic diagram of connection among common electrode units, first switches and test lines according to another embodiment. In the embodiment of FIG. 8, similar to the embodiment of FIG. 7, the test based on column inversion is performed, and the specific implementation of the test based on column inversion will not be repeated herein. Different from the embodiment of FIG. 7, each second touch line 542 has both ends electrically connected to a thin film transistor 560. Since the second touch line 542 has both ends electrically connected to a thin film transistor 560, when the test control line 571 controls the thin film transistors 560 into turned-on states, the common electrode units 530A (and the common electrode units 530B) are short circuited, and thus resistances of the second touch lines 542 are the same (or approximately the same).

In the present embodiment, since the resistances of the second touch lines 542 are the same (or approximately the same), the display effect of the embodiment of FIG. 7 can be further improved. However, in the present embodiment, at both ends of each row of common electrode units, a plurality of thin film transistors 560, a test control line 571 and test lines 570 (including a first test line 572 and a second test line 573) have to be provided, which will increase the width of the line region.

Figure 9:
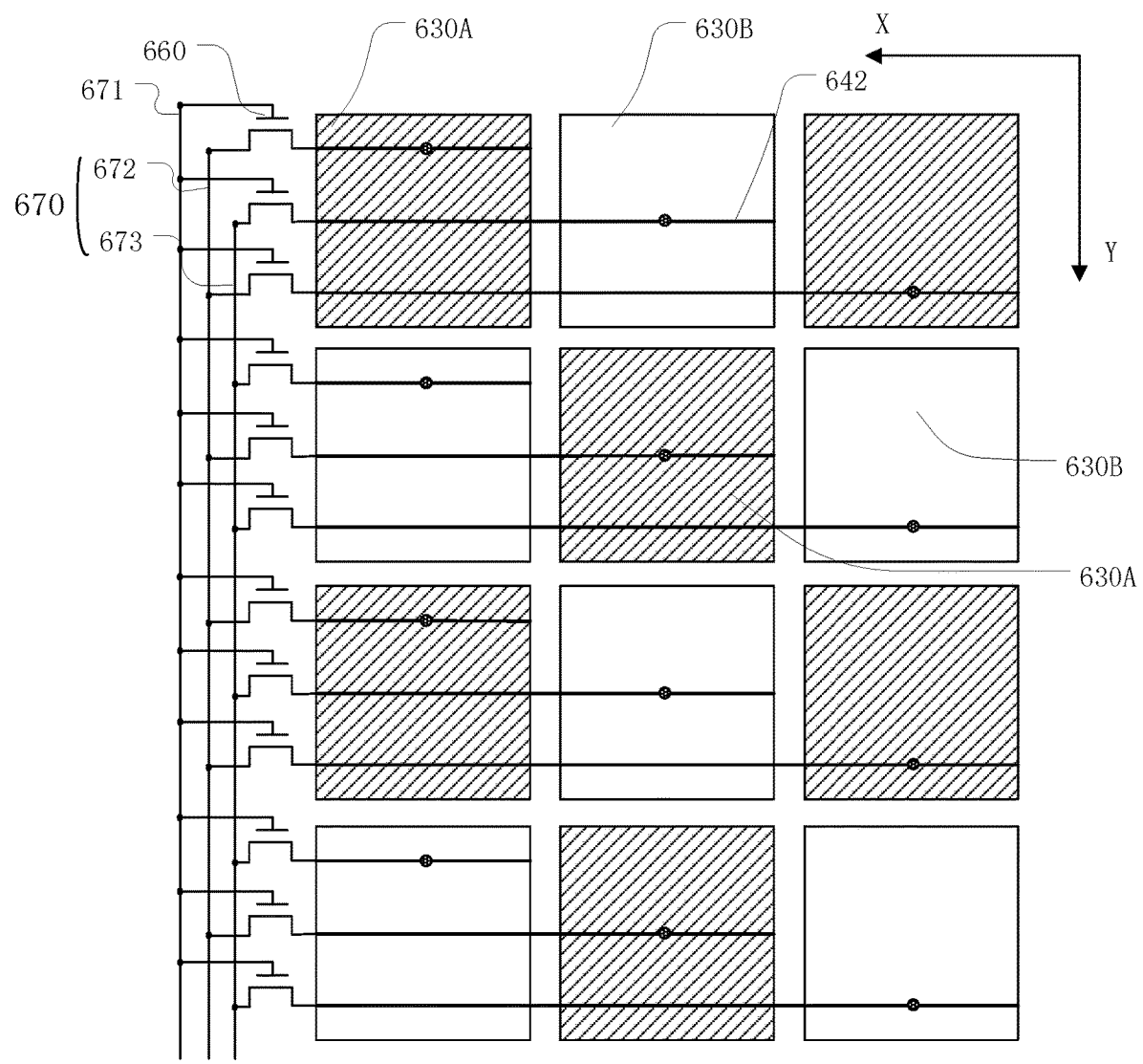
FIG. 9 is a schematic diagram of connection among common electrode units, first switches and test lines as shown in FIG. 3 according to still another embodiment.

FIG. 9 is a schematic diagram of connection among common electrode units, first switches and test lines according to still another embodiment. In the embodiment of FIG. 9, the common electrode units 630A in odd numbers of columns and odd numbers of rows and the common electrode units 630A (wherein the common electrode units 630A are shown in hatched patterns) in even numbers of columns and even numbers of rows are electrically connected to the first test line 672 through the thin film transistors 660. The common electrode units 630B in odd numbers of columns and even numbers of rows and the common electrode units 630B in even numbers of columns and odd numbers of rows are electrically connected to the second test line 673 through the thin film transistors 660. The common electrode units 630A and the common electrode units 630B are arranged in a checkerboard form.

During test, the test control line 671 controls the thin film transistors 660 to be turned-on states, and the first test line 672 and the second test line 673 respectively input a different voltage to the common electrode units 630A and the common electrode units 630B through the second touch lines 642. The voltages input by the first test line 672 and the second test line 673 are changed periodically, to perform display and touch test based on point inversion.

Since during display and touch test based on point inversion, each common electrode unit should display a different color from a surrounding (upper, lower, left or right) common electrode unit, if a common electrode unit displays the same color as one of surrounding (upper, lower, left or right) common electrode unit, it can be determined that the common electrode unit has been short circuited or open circuited.

In the present embodiment, the display effect is improved by decreasing resistance differences between touch lines, and in addition to that, a high accurate display and touch test on a short circuit or an open circuit can be performed based on point inversion.

The above FIGS. 7-9 only illustrate three connection manners among the common electrode units, the first switches and the test lines. However, those skilled in the art can devise more modified embodiments based on the description herein. For example, the display effect and the test accuracy can be further improved by combining display and touch test based on point inversion and providing first switches at both ends of the second touch lines.

Figure 10:
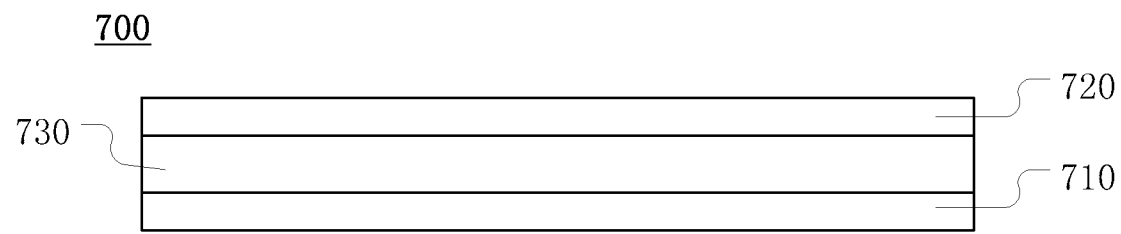
FIG. 10 is a schematic diagram of a display panel according an embodiment of the present disclosure.

According to another aspect of the present invention, a display panel is also provided, as shown in FIG. 10. The display panel 700 includes an array substrate 710, a color film substrate 720 and a liquid crystal layer 730 between the array substrate 710 and the color film substrate 720. The array substrate 710 is opposite to the color film substrate 720. The array substrate 710 can be any structure as shown in FIGS. 3-9. The array substrate 710 can also be an array substrate according to a modified embodiment based on embodiments of FIGS. 3-9. Those skilled in the art can devise other modified embodiments depending on actual panel process and panel design, which will not be repeated herein.

The array substrate and the display panel of the present disclosure have the following advantages over the prior art.

1) Test and display are performed by additionally providing second touch lines extending along the first direction (the shorter side of the array substrate), and compared with the scheme of providing only first touch lines extending along the second direction (the longer side of the array substrate), the resistance differences can be decreased, and the display effect of the display panel can be improved.

2) The common electrode units are tested for display and touch by detecting based on column inversion and pointe inversion, which can improve the accuracy of the test.

3) By providing first switches and test lines, the common electrodes are short circuited when the display panel is displaying, such that resistance of the touch lines in each row of common electrode units is the same, therefore, the display effect of the display panel can be further improved.

The specific embodiments of the present disclosure has been described. It should be understood that the present disclosure is limited to the above specific embodiments. Those skilled in the art can make various alteration and modification within the scope of the claims without departing from the substantial contents of the present disclosure.

What is claimed is:

1. An array substrate comprising a display region and a frame region surrounding the display region, wherein:
   the display region consists of a common electrode layer, a touch line layer, a gate electrode layer, and a plurality of second touch lines which are in parallel with the gate electrode lines, wherein
   the common electrode layer comprises a plurality of common electrode units,
   the touch line layer comprises a plurality of first touch lines electrically connected to the common electrode units, and
   the gate electrode layer comprises a plurality of gate electrode lines extending along a first direction, and
   each of the common electrode units is electrically connected to one of the second touch lines through a via hole, wherein each of the common electrode units are electrically connected to one of the plurality of first touch lines, and the plurality of first touch lines extend along a second direction, and the first touch line and the second touch line connected to one common electrode are extended along different direction and are intersected while not interconnected; and
   the frame region consists of a plurality of first switches and a plurality of test lines extending along the second direction, wherein at least one end of each second touch line is connected to one of the first switches, and the test lines are electrically connected to the first switches.

2. The array substrate of claim 1, wherein the second touch lines and the gate electrode lines are positioned at a same layer.

3. The array substrate of claim 2, wherein two ends of each second touch line are respectively electrically connected to one of the first switches.

4. The array substrate of claim 2 wherein the first touch lines are electrically connected to the common electrode units through via holes.

5. The array substrate of claim 2, wherein the first touch lines are extended along the second direction.

6. The array substrate of claim 5, wherein the first direction is a direction along which a shorter side of the array substrate is extended, and the second direction is a direction along which a longer side of the array substrate is extended.

7. The array substrate of claim 1, wherein the second direction is perpendicular to the first direction.

8. The array substrate of claim 7, wherein
   the first switches are thin film transistors;
   one end of each second touch line is electrically connected to a first electrode of one of the thin film transistors; and
   the test lines are electrically connected to second electrodes of one of the thin film transistors.

9. The array substrate of claim 8, wherein the array substrate further comprises at least one test control line electrically connected to control terminals of the thin film transistors.

10. The array substrate of claim 9, wherein
the test lines comprise a first test line and a second test line, and the common electrode units are arranged successively along the first direction and the second direction;
the common electrode units in odd numbers of columns are electrically connected to the first test line through the thin film transistors; and
the common electrode units in even numbers of columns are electrically connected to the second test line through the thin film transistors.

11. The array substrate of claim 9, wherein
the test lines comprise a first test line and a second test line, and the common electrode units are arranged successively along the first direction and the second direction;
the common electrode units in odd numbers of columns and odd numbers of rows and the common electrode units in even numbers of columns and even numbers of rows are electrically connected to the first test line through the thin film transistors; and
the common electrode units in odd numbers of columns and even numbers of rows and the common electrode units in even numbers of columns and odd numbers of rows are electrically connected to the second test line through the thin film transistors.

12. The array substrate of claim 9 wherein in a test stage, the thin film transistors are in turned-on states, and the first test line inputs a different voltage from a voltage input by the second test line.

13. The array substrate of claim 9 wherein in a display stage, the test control line controls the thin film transistors into turned-on states, the first test line and the second test line input common electrode signals, and the common electrode units are short circuited.

14. The array substrate of claim 9 wherein in a touch stage, the test control line controls the thin film transistors into turned-off states.

15. The array substrate of claim 8, wherein
the frame region comprises a first frame sub-region and a second frame sub-region respectively distributed at two sides of the display region along the first direction;
the thin film transistors are positioned in the first frame sub-region and/or the second frame sub-region; and
at least part of the test lines is positioned in the first frame sub-region and/or the second frame sub-region.

16. The array substrate of claim 7, wherein the common electrode units are used as common electrodes in a display stage, and used as driving touch electrodes or sensing touch electrodes in a touch stage.

17. The array substrate of claim 7, wherein the common electrode units are used as common electrodes in a display stage, and used as self-capacitive touch electrodes in a touch stage.

18. The array substrate of claim 1 wherein the frame region consists of a touch control IC, and the first touch lines and the second touch lines are electrically connected to the touch control IC.

19. The array substrate of claim 18, wherein the frame region further comprises a third frame sub-region and a fourth frame sub-region respectively distributed at two sides of the display region along the second direction, and the touch control IC is positioned in the third frame sub-region or the fourth frame sub-region.

20. A display panel comprising an array substrate and a color film substrate disposed oppositely to each other, and a liquid crystal layer between the array substrate and the color film substrate, wherein the array substrate comprising:
a display region and a frame region surrounding the display region, wherein:
the display region consists of a common electrode layer, a touch line layer, a gate electrode layer, and a plurality of second touch lines which are in parallel with the gate electrode lines, wherein
the common electrode layer comprises a plurality of common electrode units,
the touch line layer comprises a plurality of first touch lines electrically connected to the common electrode units, and
the gate electrode layer comprises a plurality of gate electrode lines extending along a first direction, and
each of the common electrode units is electrically connected to one of the second touch lines through a via hole, wherein each of the common electrode units are electrically connected to one of the plurality of first touch lines, and the plurality of first touch lines extend along a second direction, and the first touch line and the second touch line connected to one common electrode are extended along different direction and are intersected while not interconnected; and
the frame region consists of a plurality of first switches and a plurality of test lines extending along the second direction, wherein at least one end of each second touch line is connected to one of the first switches, and the test lines are electrically connected to the first switches.

* * * * *